Dec. 26, 1961 C. H. HOOVER 3,014,775
MECHANICAL SELF-RECORDING GAGE
Filed Sept. 29, 1960

INVENTOR.
Charles H. Hoover
BY
S. J. Rotondi & A. J. Dupont

United States Patent Office 3,014,775
Patented Dec. 26, 1961

3,014,775
MECHANICAL SELF-RECORDING GAGE
Charles H. Hoover, Bel Air, Md., assignor to the United States of America as represented by the Secretary of the Army
Filed Sept. 29, 1960, Ser. No. 59,463
2 Claims. (Cl. 346—77)
(Granted under Title 35, U.S. Code (1952), sec. 266)

The invention described may be manufactured and used by or for the Government of the United States for governmental purposes without the payment to me of any royalty thereon.

This invention relates to a novel, mechanically, self-energized recording gage and has for its main object to produce a device for recording impulses generated from the detonation of large charges of high explosives or other blast and shock producing means. More particularly, this invention is concerned with the producing of a permanent graphic record of pressure deviations vs. time by scribing such data on a self-actuated metallic surface which moves perpendicularly to the motion of an impulse responsive scribe.

A further object of this invention is to produce a recording device which is miniaturized, reliable, and of rugged design and construction.

These and other objects and advantages will be apparent from the following detailed description and the accompanying schematic drawing in which.

Figure 1:
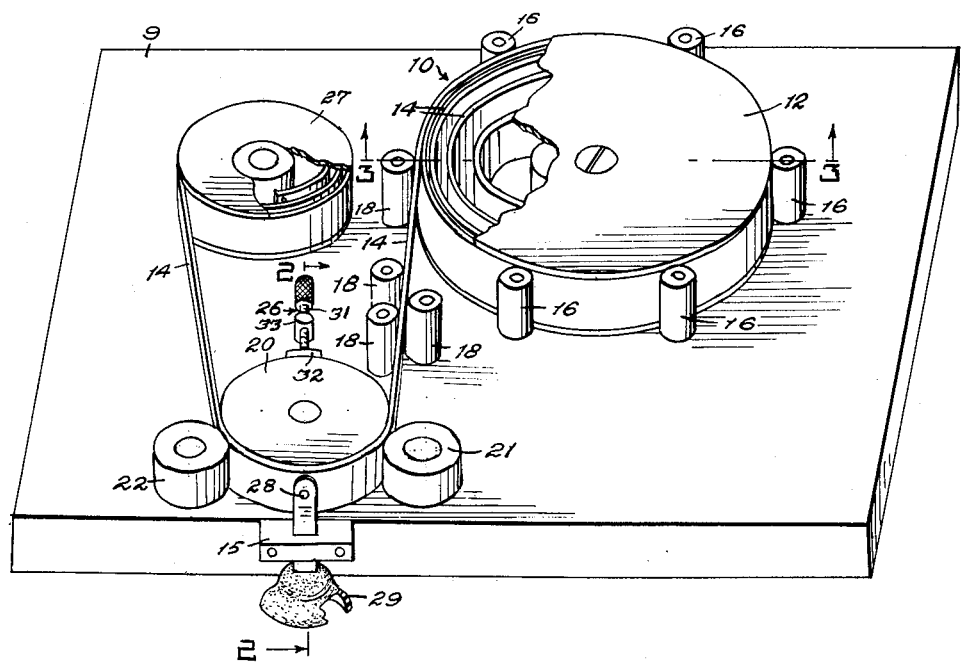
FIGURE 1 illustrates a perspective view of the recording apparatus of this invention.
Figure 2:
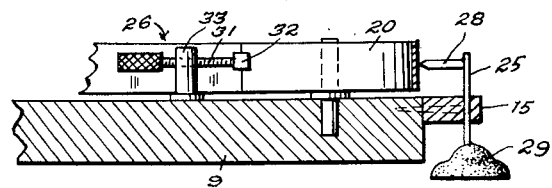
FIGURE 2 shows a cross-sectional view taken on line 2—2 of FIGURE 1 illustrating the clutch and scribe elements in elevation.
Figure 3:
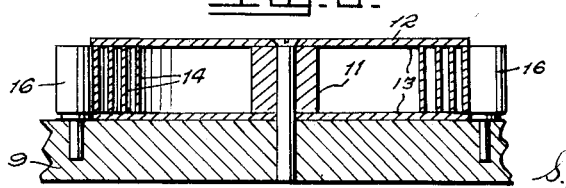
FIGURE 3 shows a cross-sectional view taken on line 3—3 of FIGURE 1 illustrating the internal construction of the reverse-wound spring motor.

Referring now with more particularity to FIGURE 1 of the drawing, there is shown thereon a base member 9 on which is mounted a spring motor 10 comprising a flanged feed-spool 12 comprising top and bottom portions 13 connected by hub 11 and having thereon a reverse-wound coil spring 14, said motor 10 being retained in position by a plurality of guide rollers 16 spaced around the periphery thereof and carried by base 9. Spring 14 leaves spool 12 through guide elements 18, also carried by base 9, and tangentially engages a portion of rotatable pressure drum 20, said drum being conventionally supported on anti-friction bearings (not shown). The radius of drum 20 is substantially equal to the natural radius of spring 14, i.e. the radius of an arch inherently or otherwise assumed by the spring within its elastic limit. Flat contact of the spring with drum 20 is thereby maintained. To further assure such flat contact, spring 14 is held firmly against pressure drum 20 by means of rotatable pressure rollers 21 and 22 carried by base 9. Mounted adjacent drum 20 is a governor or brake means 26 comprising a threaded shaft 31 with a brake shoe 32 at one end thereof and mounted on support post 33. By rotating shaft 31, shoe 32 may be placed into or out of engagement with pressure drum 20 whose rotative freedom may thereby be controlled. From roller 22, spring 14 is connected to the core of take-up spool 27. Mounted intermediate rollers 21 and 22 and in contact with pressure drum 20 is stylus 25, of leaf spring construction and urging scribe 28 into contact with spring 14. Stylus 25 is retained in position with freedom of vertical movement by means of guide bearing 15. Stylus 25, free to move up and down, i.e. reciprocate vertically, is actuated by sensor element 29. This sensor may take the form of any conventional impulse responsive pick-up mechanism, i.e. bellows, linkages, diaphragms or the like which will impart vibratory mechanical motion to stylus 25.

In summary, the device operates as follows: The flat coil spring 14 is reverse wound on itself assuming the position indicated in motor 10. A portion of said spring is threaded through guide rollers 18, around pressure drum 20 and in contact with scribe 28 terminating in take-up spool 27. The surface of spring 14 which comes in contact with scribe 28 is vapor honed to a fine surface finish so as to provide a suitable recording surface for this form of scratch-type recording. The recording stylus in traveling over this prepared surface produces a burnished line approximately .0002 inch wide which is easily readable under a 30x microscope. In this reverse wound position, spring 14 within feed-spool 12 possesses a substantial amount of potential energy. Accordingly, when stylus 25 responds to vibrations, the extent of which is to be determined, spring motor 10 is energized due to the release of brake means 26 and spring 14 commences to unwind, passing over drum 20 and winding up on take-up spool 27. The rate of speed of spring 14 past stylus 25 is governed by brake 26 and as the honed spring surface passes the vibrating scribe 29 at a constant rate of speed, a curve of displacement vs. time is scribed therein. Such a recordation is permanent and practically indestructible, the system requiring a minimum of maintenance and replacement parts. In order to minimize inertial effects drum 20 should be made as lightweight as possible consistent with necessary strength requirements.

Having particularly described my invention, it is obvious that many modifications and variations may be resorted to by those skilled in the art without departing from the scope of the appended claims.

I claim:

1. A combination spring-driven impulse recorder system comprising a motor having therein an elongated, non-extensible, resilient member possessing substantial potential energy, a portion of said member extending outwardly from said motor and into tangential engagement with a rotatable drum element, said drum element having integrally mounted therein a braking means for controlling the rotative freedom of said drum, said portion of the resilient member subsequently leaving said drum element and terminating within a receiver member.

2. A self-driven recorder system comprising the combination of: a base member, an energized mechanism carried by said base, a plurality of first guide elements peripherally spaced about said mechanism and carried by said base, a rotatable drum element, take-up spool, and plurality of second guide means each carried by said base, said second guide means disposed intermediate said drum element and mechanism, an elongated, resilient member emerging from said mechanism and threaded through said second guide means and successively engaging said drum element, the terminal end of said resilient member being connected to the interior of said take-up spool, an impulse detection means laterally supported on the edge of said base and having mounted thereon a stylus member, said detection means and stylus being juxtaposed, said drum element and said stylus being in contact with that portion of said elongated, resilient member passing over the drum element.

References Cited in the file of this patent
UNITED STATES PATENTS

| | | |
|---|---|---|
| 2,099,725 | Forest | Sept. 17, 1957 |
| 2,806,758 | Butler | Jan. 13, 1959 |
| 2,868,611 | Carleton | Jan. 13, 1959 |